United States Patent [19]

Ando et al.

[11] Patent Number: 5,347,418
[45] Date of Patent: Sep. 13, 1994

[54] FUSE BLOWOUT DETECTOR CIRCUIT

[75] Inventors: Takahiko Ando; Toshihito Mizoe, both of Aichi, Japan

[73] Assignee: Mitsubishi Denki Kabushiki Kaisha, Tokyo, Japan

[21] Appl. No.: 842,658

[22] Filed: Feb. 27, 1992

[30] Foreign Application Priority Data

Feb. 27, 1991 [JP] Japan .................. 3-032965

[51] Int. Cl.$^5$ .................. H01H 85/30; H02H 5/04
[52] U.S. Cl. .................. 361/104; 324/550; 340/638; 250/208.4
[58] Field of Search .............. 324/550, 556, 506, 531, 324/523, 525, 527, 537, 542, 547, 549, 555; 340/638; 361/104; 250/208.4, 208.5

[56] References Cited

U.S. PATENT DOCUMENTS 5,057,840  10/1991  Ledzius et al. ................ 341/144

FOREIGN PATENT DOCUMENTS 1124647  8/1989  Japan .
1127157  8/1989  Japan .

OTHER PUBLICATIONS

"SAA7350 20-bit Input Bitstream Conversion DAC for Digital Audio Systems," Philips Semiconductors, Feb. 1991.

Primary Examiner—Marc S. Hoff
Assistant Examiner—Ronald W. Leja
Attorney, Agent, or Firm—Sughrue, Mion, Zinn, Macpeak & Seas

[57] ABSTRACT

A fuse blowout detector circuit wherein the primary side of an insulated signal coupler, such as a photocoupler, is connected in parallel with a series circuit connection of a power supply and a fuse, whereby a fuse blowout detection signal is output from the secondary side of the signal coupler, independently of the ON/OFF state of the switch, when the fuse is blown.

13 Claims, 4 Drawing Sheets

FUSE BLOWOUT DETECTOR CIRCUIT

BACKGROUND OF THE INVENTION

1. Field of the Invention

The present invention relates to a fuse blowout detector circuit which detects the blowout of a fuse. The detection is made independently of the ON/OFF state of switch in an electrical circuit, that includes the switch and the fuse and is located between a power supply and a load device.

2. Description of the Background Art

It is important to detect the blowout of a fuse in an electrical circuit protected by the fuse. For this purpose, a fuse with an alarm contact may be employed or a fuse blowout detector circuit may be provided across the fuse.

FIG. 5 shows a conventional circuit for detecting a fuse blowout, as disclosed in Japanese Published Patent Application 1-127157 of 1989. In the Figure, the numeral 100 indicates an external direct current power supply (hereinafter referred to as the "power supply"), 101 a load device driven from the power supply 100, 102 a fuse, and 103 a circuit for detecting a fuse blowout and OFF-condition of an external power supply. The circuit 103 comprises a photocoupler 104 for outputting a fuse blowout signal, a resistor 105 for restricting the forward current of a light-emitting diode 104A of the photocoupler 104, a pull-up resistor 106 for making the fuse blowout signal inactive, and a switching transistor 107 acting as switch. The load 101 and power supply 100 are located at a position external to the fuse circuit structure, as indicated by the dotted line, and are connected to the internal fuse structure via connectors A and B.

The operation of the circuit shown in FIG. 5 will now be described. When the fuse 102 is operative to pass current, no current flows in the fuse blowout detector circuit 103 and a phototransistor 104B of the photocoupler 104 is not switched ON. For this reason, a FUSEL signal, i.e. fuse blowout signal, is kept high by the pull-up resistor 106 and the FUSEL signal remains OFF.

When the fuse 102 is blown, a current flows in the light-emitting diode 104A of the photocoupler 104 in the fuse blowout detector circuit 103, switching ON the transistor 104B of the photocoupler 104. Hence, the FUSEL signal is switched low to turn ON the fuse blowout signal.

It should be noted that in this fuse blowout detector circuit 103, a fuse blowout can be detected only when the power supply 100 and the load device 101 are wired externally and the transistor 107 is ON. If the transistor 107 is not ON, the condition of the fuse cannot be checked.

FIG. 6 shows a second conventional circuit for detecting the blowout of a fuse provided with an alarm contact, as disclosed in Japanese Published Patent Application 1-124647 of 1989.

Referring to FIG. 6, external wiring is as shown in FIG. 5, and 106 indicates a pull-up resistor for making the fuse blowout signal inactive and 108 a fuse with an alarm contact.

The operation of the circuit shown in FIG. 6 will now be described. When the fuse with alarm contact 108 is operative to pass current, an alarm contact 108A built therein is OFF and the FUSEL signal is kept high by the pull-up resistor 106. As a result, the fuse blowout signal remains OFF. When the fuse 108 is blown, the built-in alarm contact 108A is designed to be switched ON, thereby switching the FUSEL signal low and turning ON the fuse blowout signal.

The conventional fuse blowout detector circuit constructed as described above has a disadvantage that it cannot detect the blowout of a fuse except when an external power supply and load device are connected to the fuse and a transistor serving as the switch of the load device is ON (closed). In other words, if the transistor is not ON, it cannot be checked whether the fuse is blown. As a result, it may be uncertain whether the indication of an OFF fuse blowout condition is due to the operability of the fuse or the failure of the transistor.

In addition, the fuse blowout detector circuit employing the fuse with an alarm contact has a disadvantage in that it is not suitable for being economical or compact because its fuse and fuse holder are high-priced and large-sized.

SUMMARY OF THE INVENTION

It is accordingly an object of the present invention to overcome the disadvantages in the conventional circuit by providing a fuse blowout detector circuit which can detect the blowout of a fuse independently of the ON/OFF state of a switch connected in series with the fuse.

The first embodiment of the invention achieves a fuse blowout detector circuit wherein the primary side of an insulated signal coupler is connected in parallel with both ends of a circuit that is connected in series with a power supply and a fuse, whereby a fuse blowout detection signal is output from the secondary side of the signal coupler, independently of the ON/OFF state of the switch, when the fuse is blown.

A second embodiment achieves a fuse blowout detector circuit which, in addition to the structure of the first embodiment, includes a second signal coupler whose primary side is connected via a protective resistor in parallel with both ends of the power supply, whereby a POWER OFF detection signal can be output from the secondary side thereof when the power supply is switched OFF and the fuse blowout can be determined more reliably.

DESCRIPTION OF THE PREFERRED EMBODIMENTS

Figure 1A:
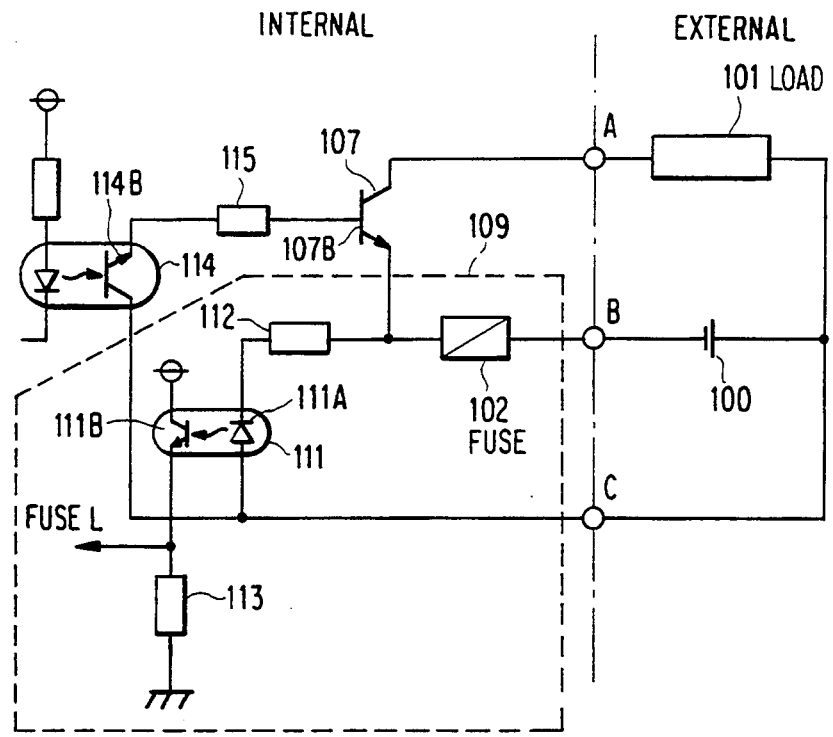
FIGS. 1A and 1B illustrate fuse blowout detector circuits in accordance with preferred embodiments of the invention.

A first embodiment of the invention will now be described with reference to FIG. 1A, wherein identical reference characters to those in the background art designate identical or corresponding parts.

Referring to FIG. 1A, the numeral 109 indicates a fuse blowout detector circuit, 111 a photocoupler for providing an insulated connection between the fuse circuit and the output signal circuit and for outputting a FUSEL signal serving as a fuse blowout signal, 112 a resistor for restricting the forward current of a light-emitting diode 111A of the photocoupler 111, 113 a pull-down resistor for defining as low the FUSEL signal acting as a fuse blowout or external supply power OFF detection signal, 114 a photocoupler for switching ON a switching transistor 107 acting as switch and 115 a resistor for restricting the base current of a transistor 107. The photocoupler 114 is used primarily to provide isolation for the operation of the switching function using transistor 107. The fuse blowout detector circuit 109 comprises the components from the photocoupler 111 to the pull-down resistor 113. The power supply 100 and load 101 are located external to the detector circuit and are connected to the internal circuit structure by connectors A-C.

The operation of the fuse blowout detector circuit illustrated in FIG. 1A will now be described. A power supply 100 and a load device 101 driven from the power supply 100 are wired outside the circuit, as indicated by the dotted line through connectors A-C. When a phototransistor 114B of the photocoupler 114 is switched ON, the voltage of the power supply 100 is applied to the transistor 107, i.e. the base current restricted by the resistor 115 flows in a base 107B of the transistor 107, the transistor 107 is switched ON, and the voltage of the power supply 100 is imposed on the load device 101, thus driving the load device 101. At this time, the fuse 102 is operative to conduct current in the fuse blowout detector circuit 109 when the power supply 100 is supplying power. Hence, the forward current restricted by the resistor 112 flows in the light-emitting diode 111A of the photocoupler 111, switching ON the phototransistor 111B of the photocoupler 111, defining the FUSEL signal as high, and turning the fuse blowout signal OFF.

When the fuse 102 is blown, the power supply 100 is not operative to supply power and no current flows in the light-emitting diode 111A of the photocoupler 111. Therefore, the phototransistor 111B of the photocoupler 111 is switched OFF, the FUSEL signal is defined as low by the pull-down resistor 113, and the fuse blowout signal is turned ON.

Similarly, when the power or external supply of the power supply 100 is switched OFF, no current can flow in the light-emitting diode 111A of the photocoupler 111. This will cause the FUSEL signal to be low and will turn ON and output the fuse blowout signal. As described above, the fuse blowout signal is output when the power supply 100 is switched OFF, even if the fuse is not blown. In this case, therefore, a fuse blowout cannot be detected. However, the connection of the power supply into the circuit of photocoupler 111 will assure that where the fuse is operable to conduct current, the FUSEL signal will be high and the fuse blowout signal will be OFF. But when the fuse does blow, a fuse blowout can be detected, even if the switching transistor 107 is OFF or if the load device 101 is not connected.

Figure 1B:
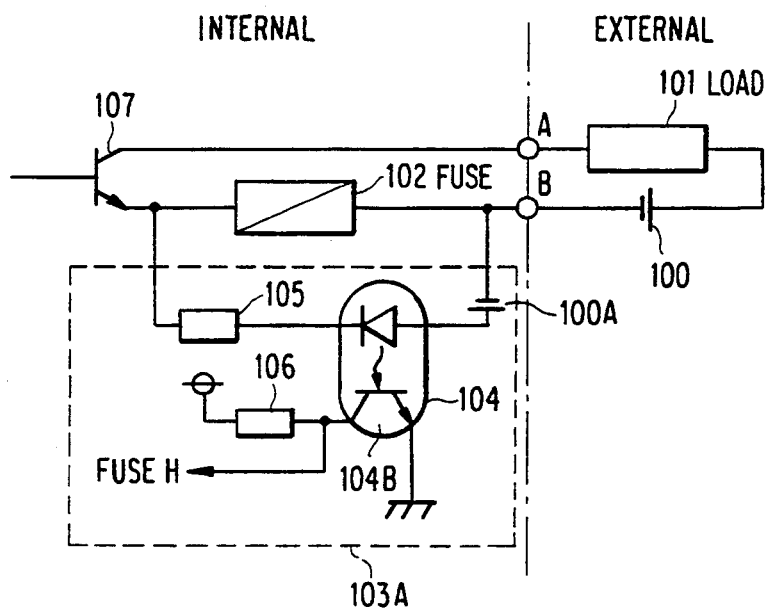
Figure 5:
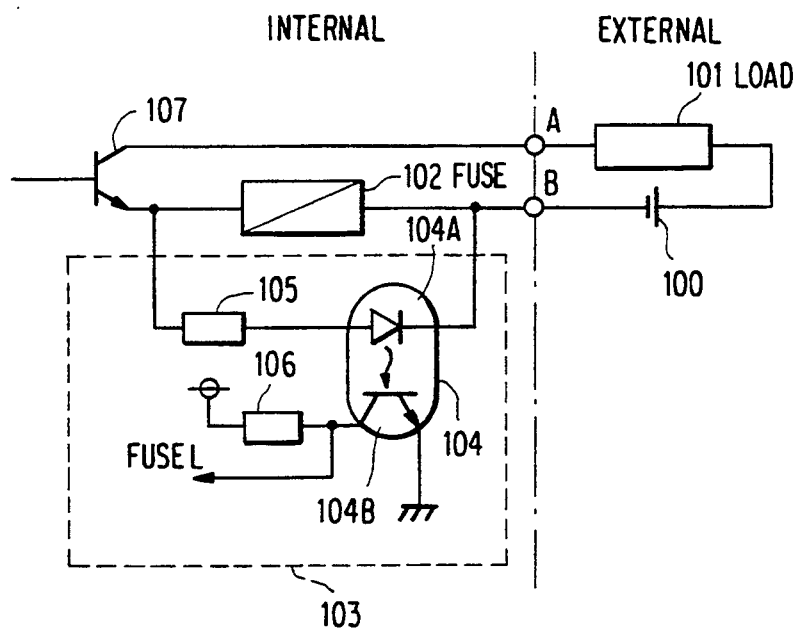
FIG. 5 illustrates a conventional fuse blowout detector circuit employing a photocoupler.
Figure 6:
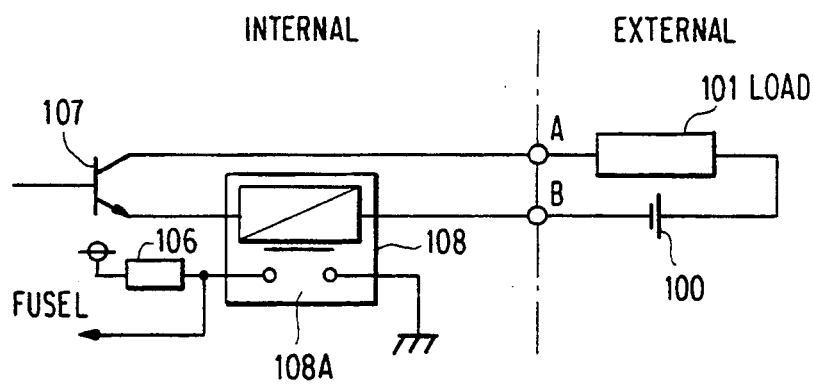
FIG. 6 illustrates a conventional fuse blowout detector circuit employing a fuse with alarm contact.

A further example of a circuit that provides independent powering of the switch 107 and photocoupler 111 is seen in FIG. 1B which is a modification of FIG. 5. In FIG. 1B, like components have the same numerical designation and a second power supply 100A is used within the blowout circuit 103A but the diode in the primary side of the photocoupler 104 is reversed.

Figure 2:
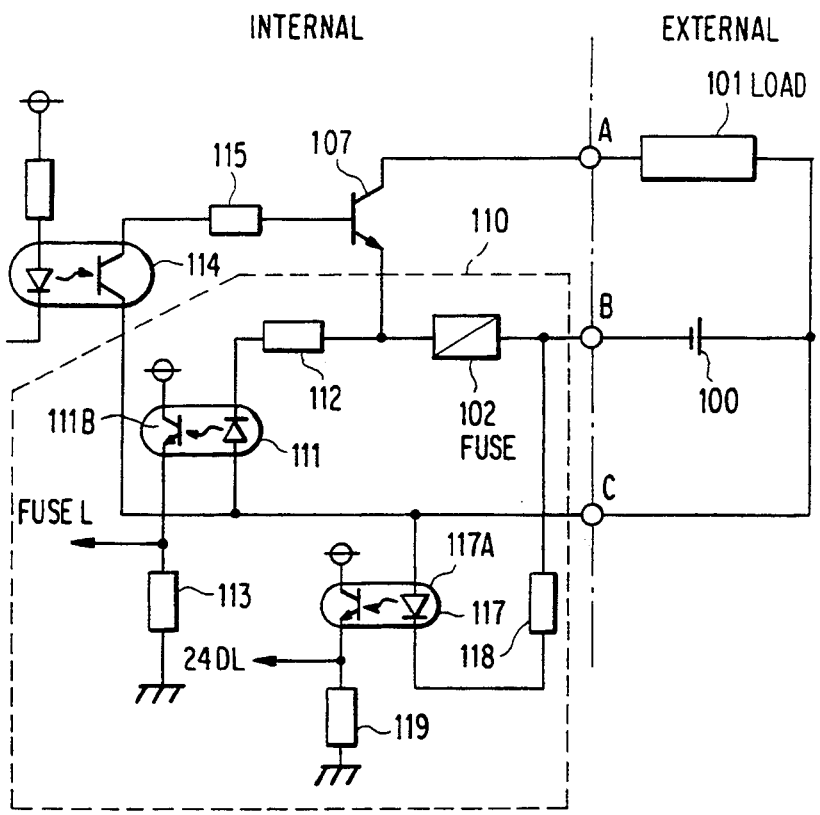
FIG. 2 illustrates a fuse blowout detector circuit in accordance with another preferred embodiment of the invention.

FIG. 2 shows a fuse blowout detector circuit having an additional external supply power OFF detector circuit across the power supply 100 in FIG. 1. In a fuse blowout detector circuit 110, the numeral 117 indicates a photocoupler for outputting a 24 DL signal serving as a POWER OFF signal when the power supply 100 is switched OFF, 118 a resistor for restricting the forward current of a light-emitting diode 117A of the photocoupler 117, and 119 a pull-down resistor for defining the POWER OFF signal 24 DL as low.

The operation of the fuse blowout detector circuit 110 shown in FIG. 2 will now be described. The fundamental operation is identical to that described for the fuse blowout detector circuit 109 shown in FIG. 1. Namely, when the fuse 102 is conducting current, the phototransistor 111B of the photocoupler 111 is ON, defining the FUSEL signal as high and turning the fuse blowout signal OFF. On the other hand, when the fuse 102 is blown, the phototransistor 111B of the photocoupler 111 is switched OFF, defining the FUSEL signal as low and turning the fuse blowout signal ON.

In the meantime, when the power is supplied by the power supply 100, the forward current restricted by the resistor 118 flows in the light-emitting diode 117A of the photocoupler 117 to switch ON the phototransistor 117B on a secondary side, causing the 24 DL signal acting as the POWER OFF signal to be defined as high, independently of whether the fuse 102 is being energized or has blown, and causing the POWER OFF signal to be turned OFF.

On the other hand, when the power is not supplied by the power supply 100, the forward current does not flow in the photocouplers 111 and 117, defining both the FUSEL signal and 24 DL signal as low and turning ON both the fuse blowout signal and POWER OFF signal.

When the POWER OFF signal is OFF and the fuse blowout signal is ON, the fuse 102 is defined as blown. However, when the POWER OFF signal is ON, i.e. the power supply 100 is OFF, it is unknown whether the fuse 102 has blown or not if the fuse blowout signal is ON. However, as opposed to the first embodiment which determines the fuse 102 as blown when the fuse blowout signal is ON, leaving whether the power is OFF or ON unknown, the embodiment shown in FIG. 2 allows a fuse blowout to be determined more reliably.

Also, when the FUSEL signal serving as the fuse blowout signal is defined as high and turned OFF, and the 24 DL signal acting as the POWER OFF signal is defined as low and turned ON, the two output signals allow the user to know that the internal circuit is faulty. That is, except when the internal circuit is faulty, it is impossible to generate an indication that the fuse is not blown when the power supply 100 has been switched OFF.

Figure 3:
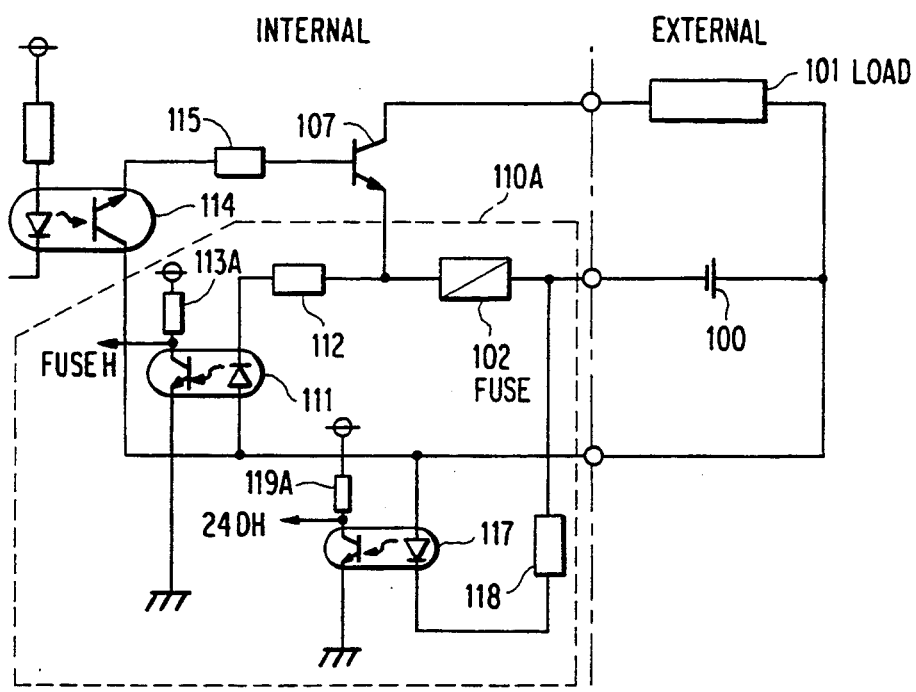
FIG. 3 illustrates a fuse blowout detector circuit in accordance with an alternative embodiment of the invention.

It will be appreciated that the fuse blowout and POWER OFF signals, designated as the FUSEL and 24 DL signals, respectively, which are low active in FIG. 1 and FIG. 2, may be made high active by inserting limiting resistors 113A and 119A in the power supply side and designated as FUSEH and 24 DH, respectively, as shown in FIG. 3 to produce an identical effect to the fuse blowout detector circuits shown in FIG. 1 and FIG. 2.

It will also be appreciated that a sink output circuit employing an NPN transistor as the switching transistor 107 serving as the switch in FIG. 1A and FIG. 2 may be a source output circuit using a PNP transistor to have an identical effect to the fuse blowout detector circuits 109 and 110.

It will further be appreciated that the switching transistor 107 employed as the switch in the output circuits of FIG. 1 and FIG. 2 may be replaced by an FET to make an identical effect to the fuse blowout detector circuits 109 and 110.

Figure 4A:
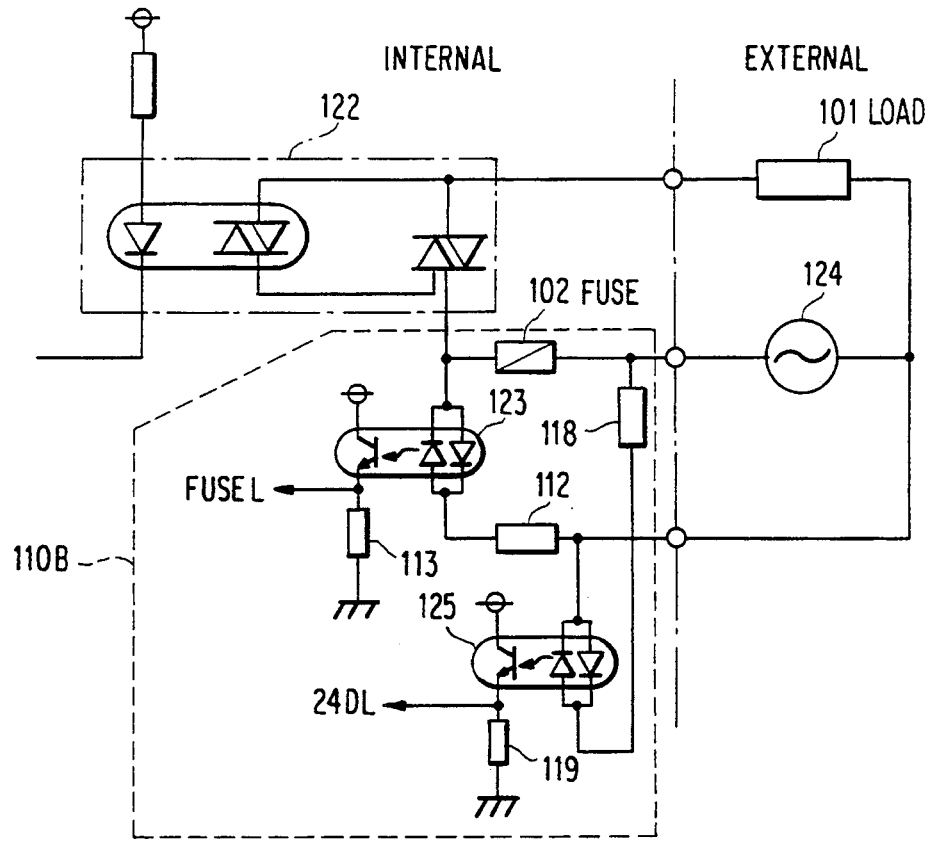
FIGS. 4A and 4B illustrate a fuse blowout detector circuit in accordance with a further preferred embodiment of the invention.

The direct current output circuit shown in FIG. 1A and FIG. 2, wherein the power supply 101 is a direct current power supply and the switching transistor 107, acting as the switch, and the photocouplers 111, 117 are employed, may be an alternating current output circuit which uses an alternating current switching triac 122 and alternating current inputting photocouplers 123 and 125, as in a fuse blowout detector circuit 110B illustrated in FIG. 4A. In that Figure, the circuit is connected with an alternating current power supply 124 serving as an external circuit in order to produce an identical effect.

Figure 4B:
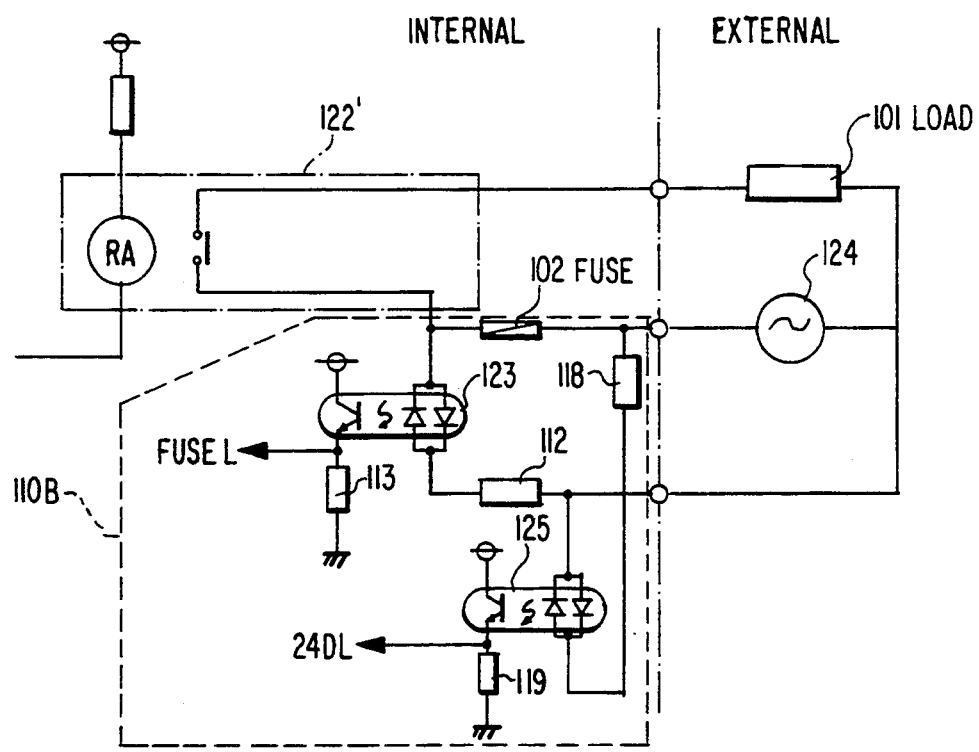

As an alternative to using the photocoupler 111 in the above embodiments, a transistor can be used so long as it is insulated, i.e., operative to withstand surges of voltage which may erroneously trigger a blowout signal in a conventional transistor. Relays also could be used, since the coil is mechanically insulated against surge voltage, if size or cost are not considerations. For example, it should be noted that the triac 122 employed in FIG. 4A as the switch may be replaced by a relay to have an identical effect, as illustrated in FIG. 4B.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A fuse blowout detector circuit for insertion between a power supply and a load device of an electrical circuit which includes a switching means for controlling the supply of power from said power supply to said load, said fuse blowout detector circuit comprising:
   fuse means for protecting said load device from an overcurrent;
   an output circuit for outputting a fuse blowout detection signal; and
   insulated switching means having a primary side and a secondary side, said primary side being connected in parallel with a series connection of said power supply and said fuse means, said secondary side being connected to said output circuit for initiating output of a fuse blowout detection signal from said output circuit when said fuse means is blown, independently of an on/off state of said switching means.

2. The fuse blowout detector circuit of claim 1, wherein said insulated switching means comprises a photocoupler means.

3. The fuse blowout detector circuit of claim 1, wherein said insulated switching means comprises a phototransistor.

4. The fuse blowout detector circuit of claim 1, wherein a protective resistance means is connected between said insulated switching means and said fuse means.

5. A fuse blowout detector circuit for insertion between a power supply and a load device of an electrical circuit which includes a switching means for controlling the supply of power from said power supply to said load, said fuse blowout detector circuit comprising:
   fuse means for protecting said load device from an overcurrent;
   an output circuit for outputting a fuse blowout detection signal;
   insulated switching means having a primary side and a secondary side; and
   an independent power supply means connected to a junction point between said fuse means and said power supply and to said primary side of said insulating switching means to supply power to the primary side of said insulated switching means;
   said primary side of said insulated switching means being connected in parallel with said fuse means, said secondary side being connected to said output circuit for initiating output of a fuse blowout detection signal from said output circuit when said fuse means is blown, independently of an on/off state of said switching means.

6. The fuse blowout detector circuit of claim 5, wherein a protective resistance means is connected between said insulated switching means and said fuse means.

7. A fuse blowout detector circuit for insertion between a power supply and a load device of an electrical circuit which includes a switching means for controlling the supply of power from said power supply to said load, said fuse blowout detector circuit comprising:
   fuse means for protecting said load device from an overcurrent;
   an output circuit for outputting a fuse blowout detection signal; and
   insulated switching means, wherein said insulated switching means is connected in parallel with said fuse means and wherein a second power source is connected in series with said insulated switching means.

8. The fuse blowout detector circuit of claim 7, wherein a protective resistance means is connected between said insulated switching means and said fuse means.

9. A fuse blowout detector circuit for insertion between a power supply and a load device of an electrical circuit including switching means for controlling the supply of power from said power supply to said load device and a fuse for protecting said load device from an overcurrent, said fuse blowout detector circuit comprising:
   a first insulated signal coupler means having a primary side connected in parallel with both ends of a circuit comprising a series connection of said power supply and said fuse, and a secondary side insulated from said first side for outputting a fuse blowout detection signal when said fuse is blown, independently of an on/off state of said switching means, and a second insulated signal coupler means having a primary side thereof connected in parallel with both ends of said power supply and a secondary side for outputting a power off detection signal when said power supply is switched off.

10. The fuse blowout circuit of claim 9, wherein at least one of said first and second insulated signal coupler means comprises an electronic switching means.

11. The fuse blowout circuit of claim 10, wherein a protective resistor is connected between said electronic switching means and said fuse.

12. The fuse blowout circuit of claim 10, wherein said electronic switching means comprises a photocoupler comprising a light-emitting diode and a phototransistor.

13. The fuse blowout circuit of claim 9, wherein at least one of said first and second insulated signal coupler means comprises a relay means.

* * * * *